(12) United States Patent
Stemplinger

(10) Patent No.: US 6,512,770 B1
(45) Date of Patent: Jan. 28, 2003

(54) METHOD FOR ROUTING WITH SELECTABLE GRANULARITY OF THE RATE OF ASYNCHRONOUSLY TRANSMITTED MESSAGE CELLS

(75) Inventor: Robert Stemplinger, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/297,405
(22) PCT Filed: Oct. 7, 1997
(86) PCT No.: PCT/DE97/02295
§ 371 (c)(1),
(2), (4) Date: Apr. 29, 1999
(87) PCT Pub. No.: WO98/19494
PCT Pub. Date: May 7, 1998

(30) Foreign Application Priority Data

Oct. 31, 1996 (DE) .......................... 196 44 099

(51) Int. Cl.[7] .............................................. H04L 12/56
(52) U.S. Cl. ................................ 370/395.1; 370/395.43
(58) Field of Search ............................ 370/385, 395.1, 370/396, 397, 398, 395.2, 395.42, 395.43

(56) References Cited

U.S. PATENT DOCUMENTS 5,390,184 A * 2/1995 Morris
5,533,020 A * 7/1996 Bryn et al.
5,570,360 A 10/1996 Klausmeier et al. ..... 370/395.1
6,167,041 A * 12/2000 Afanador

FOREIGN PATENT DOCUMENTS

EP  0 710 046 A2   5/1996

OTHER PUBLICATIONS

Guaranteeing Bandwidth and Minimizing Delay in Packet–Switched (ATM) Networks, Pancha et al.. pp. 1064–1070.

* cited by examiner

*Primary Examiner*—Ken Vanderpuye
(74) *Attorney, Agent, or Firm*—Schiff Hardin & Waite

(57) ABSTRACT

A device for routing message cells transferred by asynchronous transfer mode, provided with a counter to maintain the declared message cell rate for a block within an overall available message cell rate. In order to maintain a predetermined granularity for all division ratios the counter clock follows the message cell cycle during fractional overflow.

1 Claim, 4 Drawing Sheets

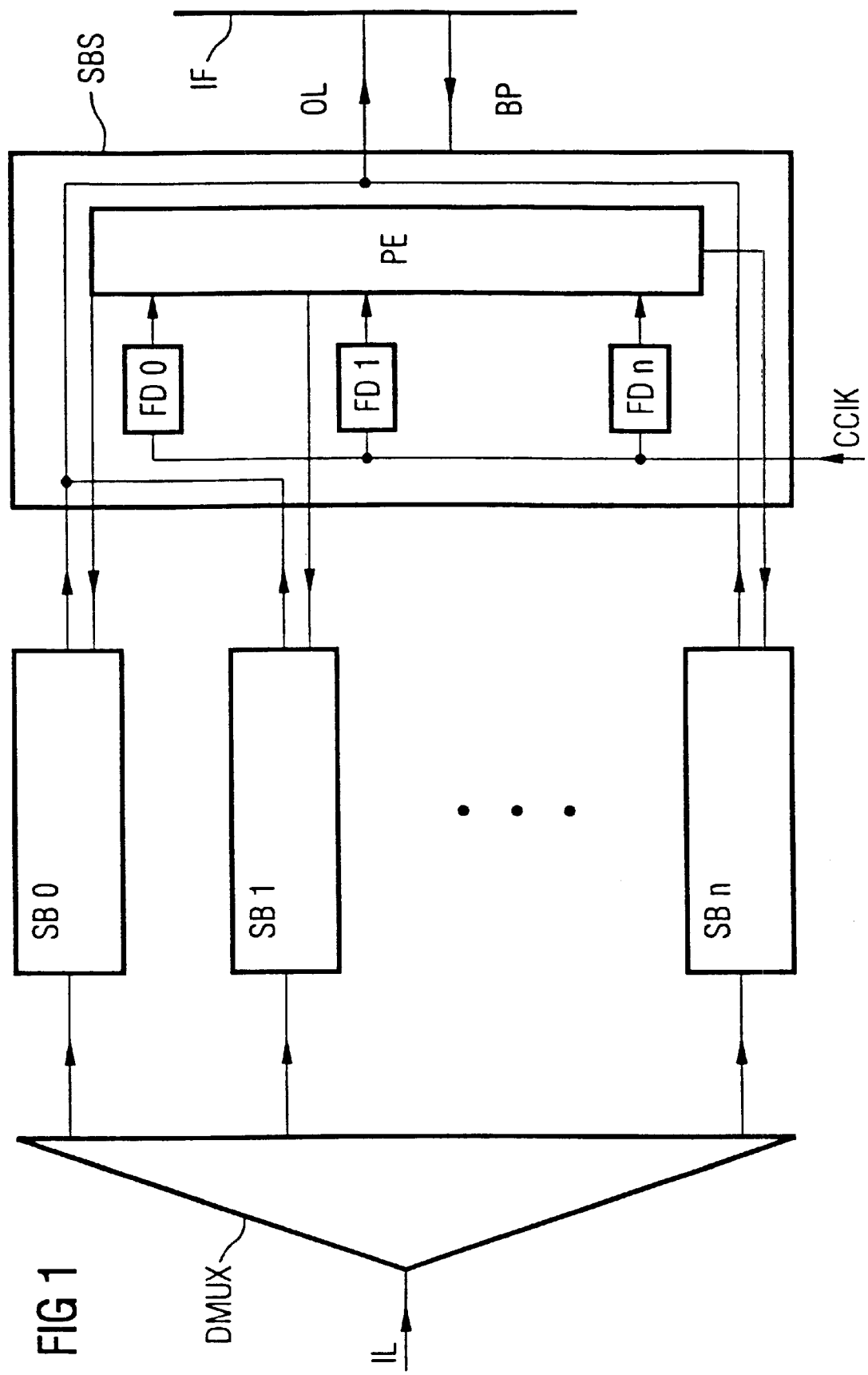

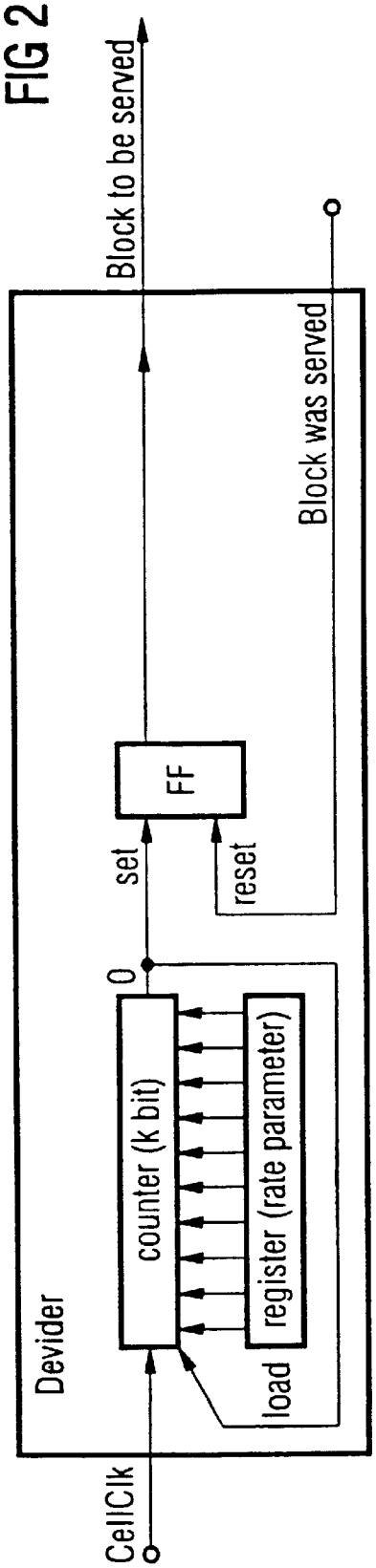
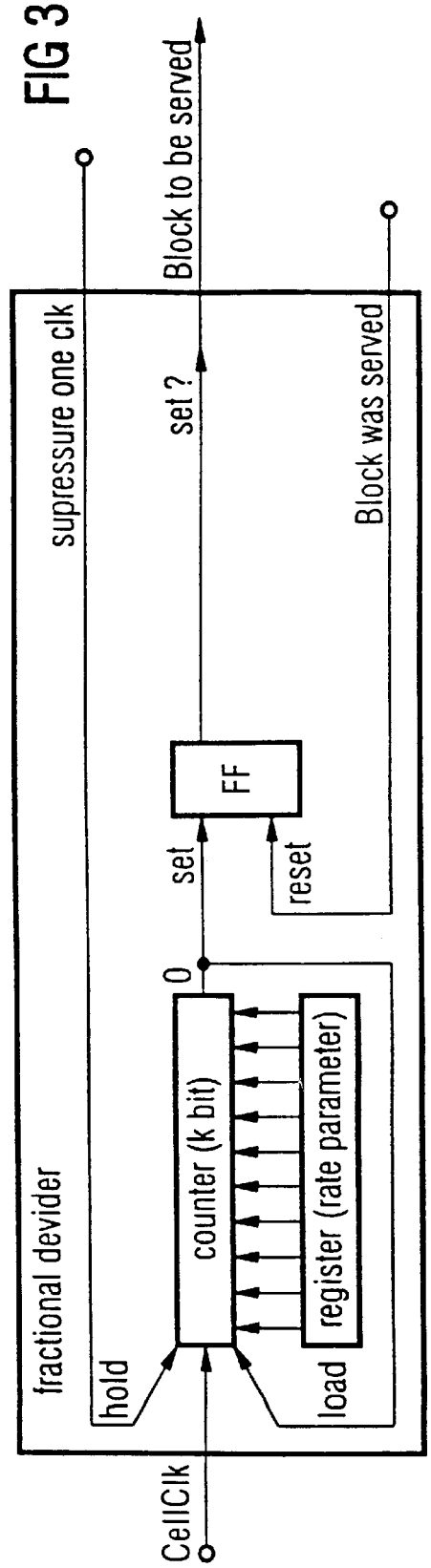

METHOD FOR ROUTING WITH SELECTABLE GRANULARITY OF THE RATE OF ASYNCHRONOUSLY TRANSMITTED MESSAGE CELLS

BACKGROUND OF THE INVENTION

1. Field of the Invention

The present invention relates to a method for routing with selectable granularity of the rate of asynchronously transmitted message cells, wherein a counter is established for a block, the counter works with a clock signal whose cycle is equal to a message cell cycle, a rate parameter equal to the declared message cell rate corresponds to a counter reading, and when the counter reading of the counter for the block is reached, a message cells is forwarded.

2. Description of the Prior Art

It is generally standard practice to determine a part of a declared message cell rate with the assistance of a counter employed as divider. In view of the allocation of a declared message rate for a block in the overall message cell rate that is available in a following interface, it is considered obvious to utilize a counter that is clocked in the clock of the message cell rate and that outputs a status character for forwarding a message cell when a counter reading corresponding to the declared message cell rate for the block is reached. It is thereby felt to be disturbing that the step width, which is also referred to as granularity in the technical field, that can be set becomes coarser and coarser with an increase in the declared message cell rate (divisor ratio 1, 2, 3,4 . . . ).

The present invention is thereof directed to improving the known method outlined at the start such that a predetermined step width can be adhered to even given large division relationships of the declared message cell rate in the overall message cell rate.

SUMMARY OF THE INVENTION

Therefore, pursuant to the present invention when forwarding a message cell, the value of a variable $N_{serv}frac$ is increased by a value that is equal to $T_{serv}frac$ Modulo $2^z$, where $T_{serv}frac$ is established by the fractional part of the rate parameter and z is established by 1d=1/percentage granularity; and when the value range of the variable $N_{serv}frac$ is outwardly exceeded, one cycle of the clock signal supplied to the counter is suppressed.

Even given a large share of the declared message cell rate for a block in terms of the overall message cell rate, the subject matter of the present invention produces a close matchability of the message cell rate with which the block is actually serviced to the declared message cell rate.

Additional features and advantages of the present invention are described in, and will be apparent from, the Detailed Description of the Preferred Embodiments and the Drawing.

DESCRIPTION OF THE DRAWING

FIG. 1 shows a schematic illustration of an arrangement for handling message cells;

FIG. 2 shows further details of the unit referenced SPS in FIG. 1;

FIG. 3 shows further details of the unit referenced FD in FIG. 1;

DETAILED DESCRIPTION OF THE PREFERRED EMBODIMENTS

Figure 4:
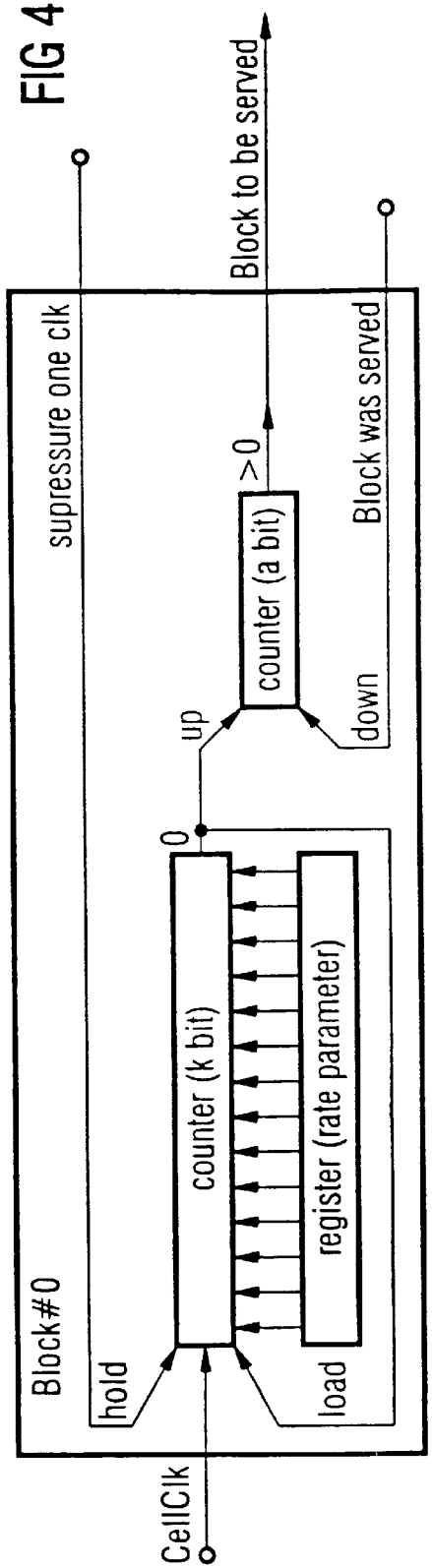
FIG. 4 shows a further development of the unit FD.

Given the routing means of FIG. 1, message cells that are intended for forwarding via an output line OL are intermediately stored and organized in blocks SB0 . . . SBn, for example 64 blocks, as queues. The message cells have a fixed length and are forwarded according to an asynchronous transfer method; particularly, the ATM (asynchronous transfer mode) transmission method during the course of virtual connections. The message cells supplied to a respective block are introduced on an input line IL and be supplied to a respective block in a distributor means DMUX (standing for: demultiplexer) according to the criterion of the appertaining virtual connection. An allocation means SBS (standing for scheduler block scheduler) assigns authorizations for the forwarding of a respective message cell to an interface IF to the blocks.

The time span $T_{cell}$ during which a forwarded message cell occupies a line determines a message cell cycle. A message cell cycle is equal to a cycle of a message cell clock CClk (standing for cell clock). The scheduler block scheduler determines which block forwards a message cell for each message cell cycle. The scheduler block scheduler includes a counter FD0 . . . FDn for each block. The message cell clock is supplied to the input side of the counters. When the counters reach a counter reading that corresponds to the message cell rate declared for the appertaining block, it outputs a status character to a prioritization means PE (standing for priority encoder). The, priority encoder selects a block from the blocks for which a status character is set, based on the criterion of the priorities allocated to the individual blocks, and assigns it an authorization for forwarding a message cell. The priority encoder searches the counters for set status characters in every message cell cycle according to a mechanism referred to as round-robin mechanism in the technical field.

The counter of FIG. 2 should be able to set a predetermined message cell rate. To that end, the message cell clock is divided by a predetermined value using a rate counter (counter k bit). The size of this divisor is predetermined by the minimum message cell rate $R_{min}$ to be set. The rate parameter $T_{serv}=1_l/_l R_{serv}$ is deposited in the register (rate parameter). The rate counter is loaded with $R_{serv}$ and de-increments its counter value by 1 with every message cell cycle. When the counter reading reaches a value of 0, the counter is reloaded and a status character (flag) is set at the output of a flipflop FF in order to indicate that a message cell can be read from the appertaining block. When a message cell for this block was read out, this flag is reset. The message cell rate (service rate) derives from $R_{serv}=1/(T_{serv} \times T_{cell})$.

The adjustable step width, also which is referred to as granularity, becomes coarser and coarser given increasing message cell rates (divisor ratio 1, 2, 3,4 . . . ).

Two variables are stored for the fractional divider according to FIG. 3: $T_{serv}frac$: fractional part of the rate parameter (z bits);

$N_{serv}frac$: momentary sum of the fractional part (z bits).

$T_{serv}count$: integer (counter) part of the rate parameter (k bits); and $N_{serv}count$: momentary counter reading (k bits).

The calculation of the fractional part occurs either locally in the corresponding block given the respective run-down of the counter or occurs once centrally (variables in tables) given the respective readout from this block.

The algorithm reads as follows:

if ($N_{serv}$count=0/block was served) then $N_{serv}$frac=$N_{serv}$frac+$T_{serv}$ modulo $2^z$ if (overflow of $N_{serv}$frac) then set Flag supressure one clk'

The status character flag is reset in the next message cell cycle and the counting for this message cell cycle is interrupted. The rate thus derives as:

$$R_{serv}=1/[(T_{serv}\text{count}+T_{serv}\text{frac})*T_{cell})]$$

$$z=ld[1/(\text{granularity (for example, 1\%))}]$$

All counters run independently of one another in parallel. A plurality of counters simultaneously can run down in a message cell cycle. However, only one block can be serviced in each message cell cycle, so that counters also can multiply run down without having been serviced. A delay of the message cells occurs therefrom (cell delay variation). The declared message cell rate must be adhered to for each block. Given a counter of FIG. 4, the flipflop from FIG. 4 that outputs the status character is replaced by an event counter (counter a bit). The counter reading of this event counter is incremented by 1 when the rate counter (counter k bit) runs down. The counter reading of the event counter is de-incremented by 1 when a message cell was read out for the appertaining block. The event counter can assume as many statuses as there are blocks provided in the routing means. As long as the counter reading of the event counter is greater than 0, a status character is output to the priority encoder.

Figure 5:
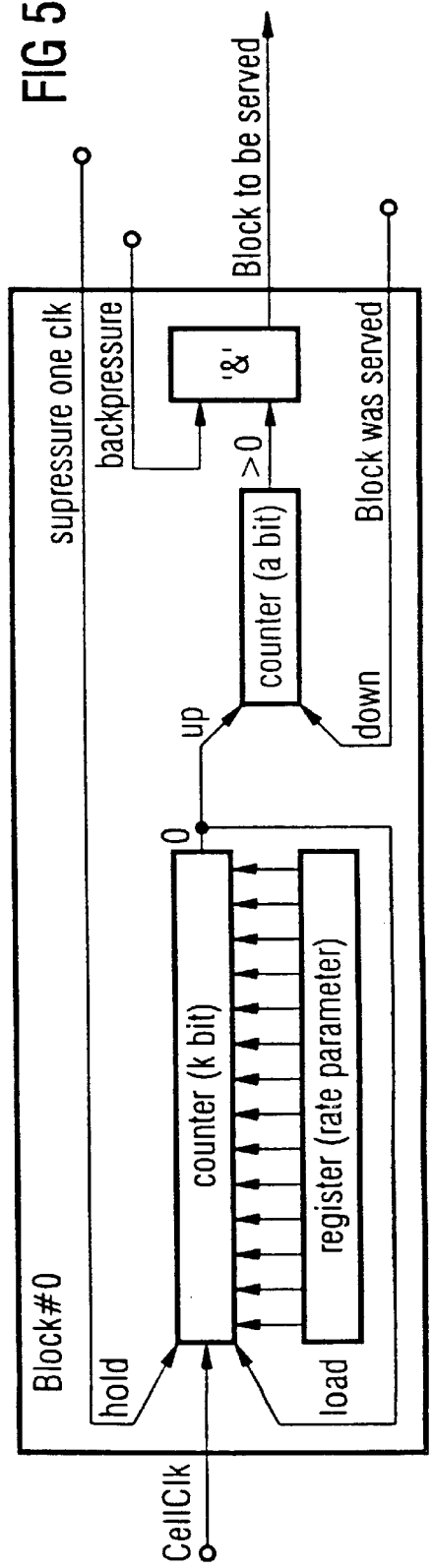
FIG. 5 shows a further development of the unit FD.

The interface to which the message cells are forwarded is established by a standardized UTOPIA interface. This interface supports back pressure of traffic. The scheduler block scheduler should be able to react to the back pressure signals of the interface, wherein the declared message cell rates should nonetheless be adhered to. One block (port shaping) or a plurality of blocks (virtual path shaping) can be allocated to a physical interface. Given the embodiment of the present invention according to FIG. 5, the status signal output by the event counter is logically operated with the back pressure signal of the allocated interface. When the back pressure signal is set, a status character is not output to the priority encoder, a forwarding of a message cell being thus suppressed. The executive sequence events, however, are counted in the event counter, so that message cells that were not forwarded during an active back pressure signal are forwarded in the message cell cycles that follow the absence of the effective back pressure signal wherein, the declared message cell rate is capable of being adhered to.

The forwarding means allocates message cells to a following interface in a quantity that takes the maximum data rate of the interface into consideration. When the rate with which the forwarding means forwards message cells is set somewhat higher than that which corresponds to the date rate of the interface, a 100% traffic load of the interface can be achieved.

Figure 6:
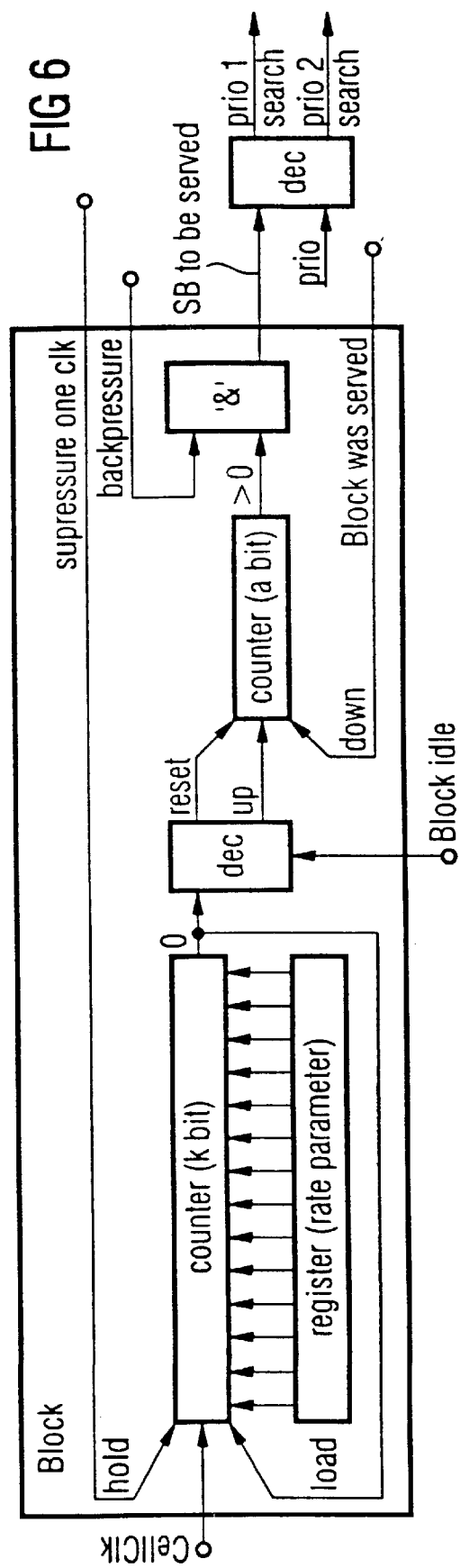
FIG. 6 shows a further development of the unit FD.

When virtual connections whose message cells are handled by the scheduler block scheduler are routed over an interface, adherence to a traffic load of the interface at 100% is not initially established. Given the embodiment of FIG. 6, a block is allocated to a virtual path (with the rate of this virtual path) and a separate block is allocated for the remaining rate of the interface. The separate block contains a lower priority in the readout algorithm. At the same time, the blocks are expanded by a display "block idle" as to whether an appertaining block contains message cells or is empty. The indication "block idle" is supplied to a decoding means dec inserted between the rate counter and the event counter. When a rate counter runs down and when the appertaining block is empty, the event counter is reset. Thus, only those blocks that contain message cells are serviced, and no message cell cycle is lost for the forwarding of a message cell.

Although the present invention has been described with reference to specific embodiments, those of skill in the art will recognize that changes may be made thereto without departing from the spirit and scope of the invention as set forth in the hereafter appended claims.

What is claimed is:

1. A method for routing with selectable granularity of a rate of asynchronously transmitted message cells, the method comprising the steps of:

establishing a counter for a block;

working the counter with a clock signal having a cycle which is equal to a message cell cycle;

corresponding a rate parameter equal to a set message cell rate of a counter reading;

forwarding a message cell when the counter reading of the counter for the block is reached;

increasing, when forwarding a message cell, a value of a variable $N_{serv}$frac by a value that is equal to $T_{serv}$frac Modulo $2^z$, wherein the variable $T_{serv}$frac is a fractional part of the rate parameter having z bits and $N_{serv}$frac is a momentary sum of the factional part having z bits and wherein z=ld(1/granularity); and suppressing one cycle of the clock signal supplied to the counter when a value range of the variable $N_{serv}$frac is exceeded upon increasing of the variable $N_{serv}$frac, wherein the granularity is the step width of the set rate of transmitted message cells.

* * * * *